Aug. 14, 1923. 1,464,955
C. B. PARKER
AUTOMATIC TRAIN CONTROL
Filed Dec. 7, 1922 7 Sheets-Sheet 1

Inventor
Charles B. Parker

Aug. 14, 1923.
C. B. PARKER
AUTOMATIC TRAIN CONTROL
Filed Dec. 7, 1922
1,464,955
7 Sheets-Sheet 2
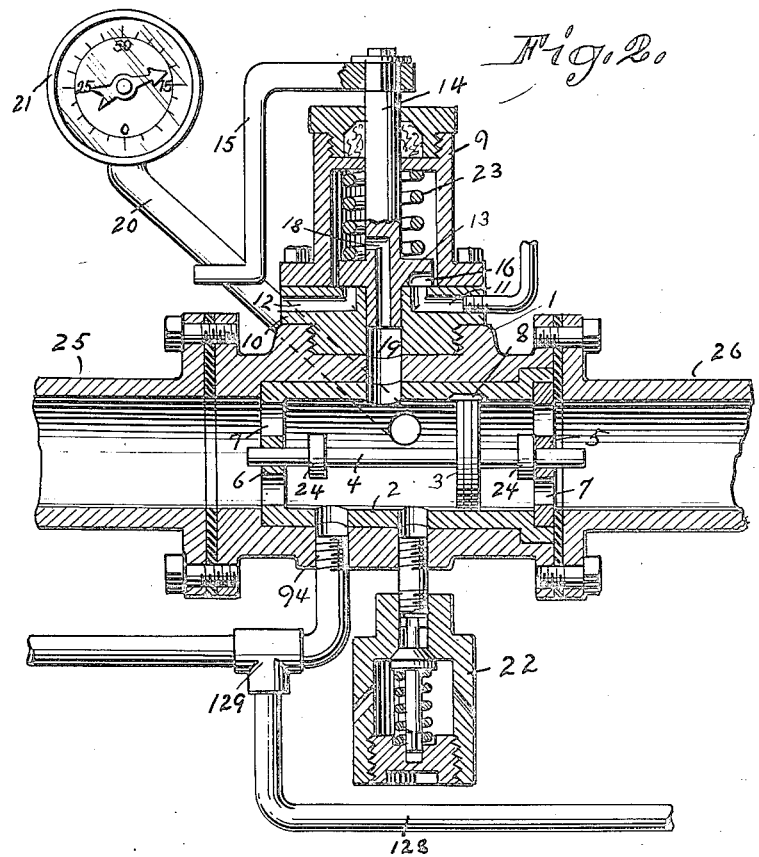
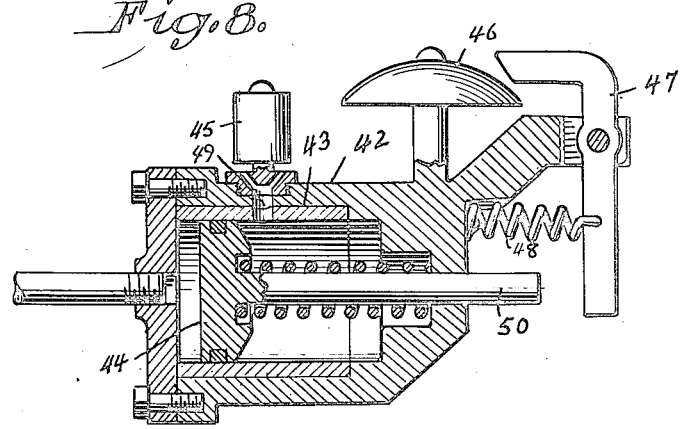
Inventor
Charles B Parker

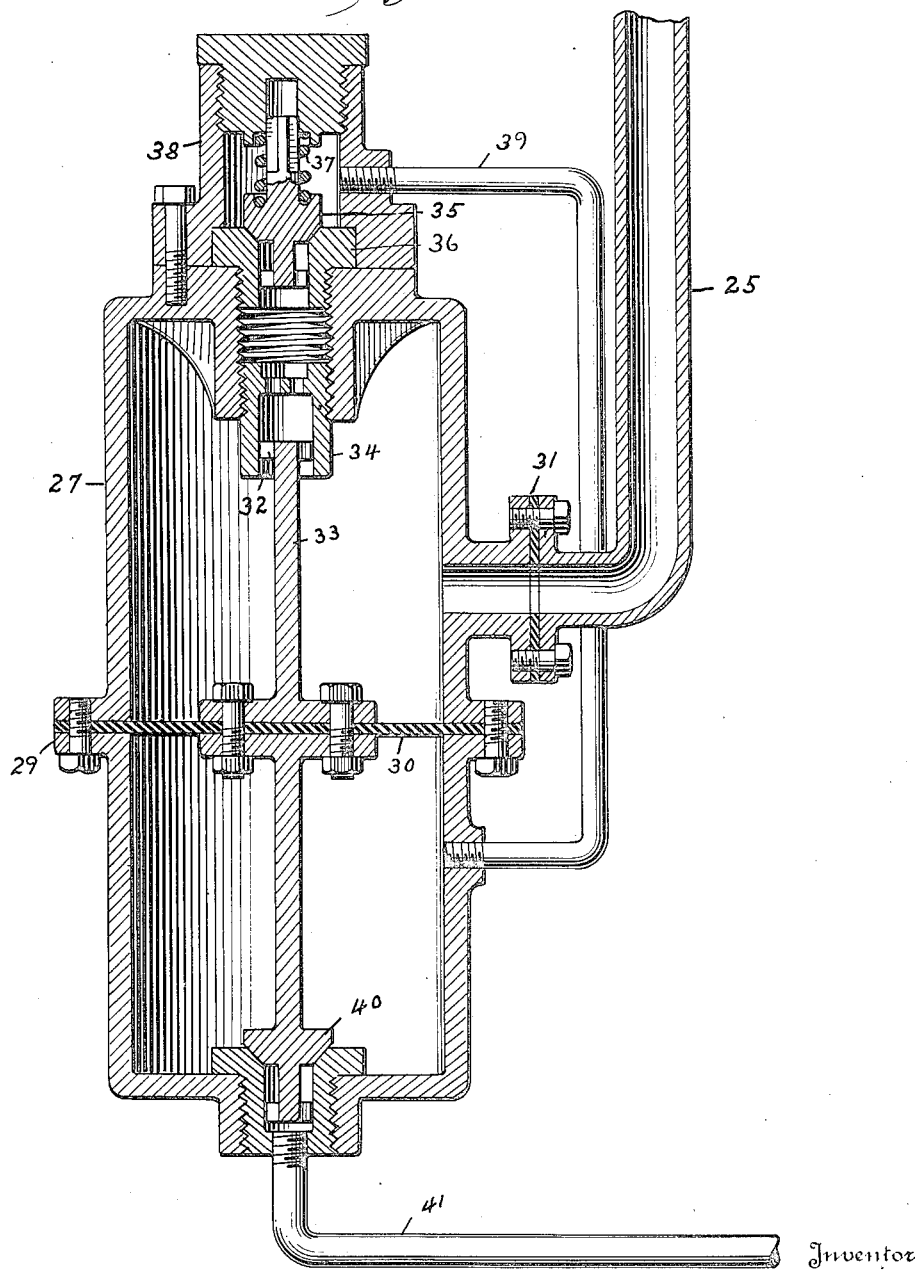

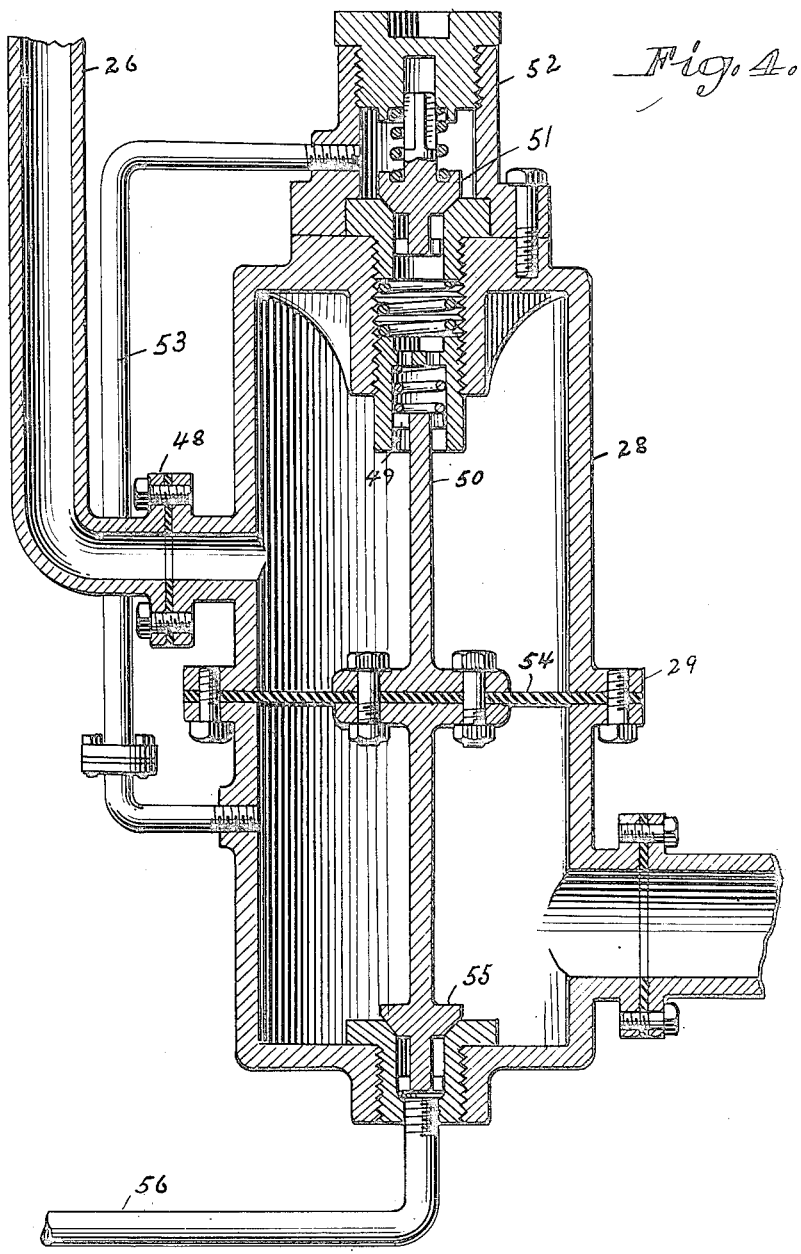

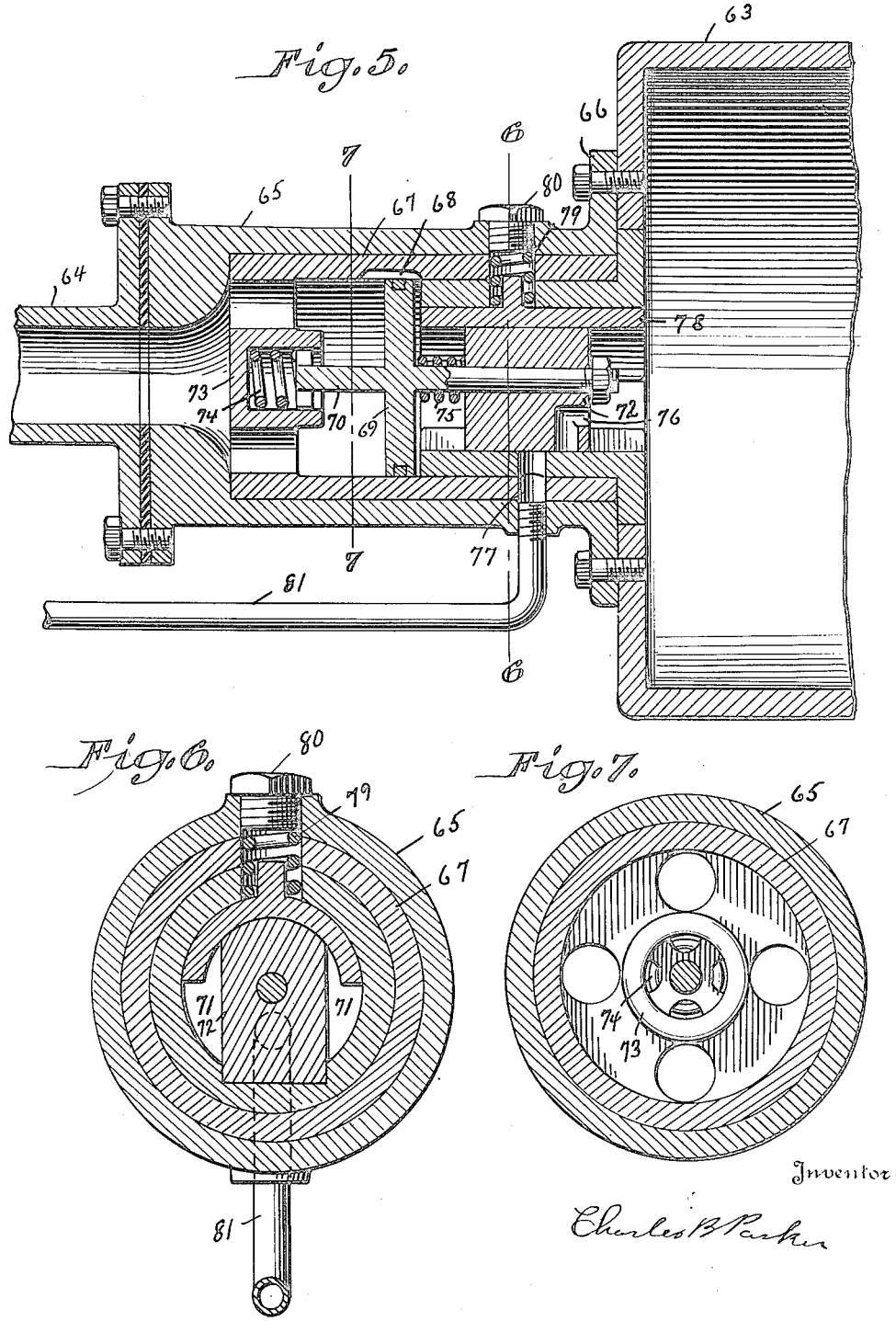

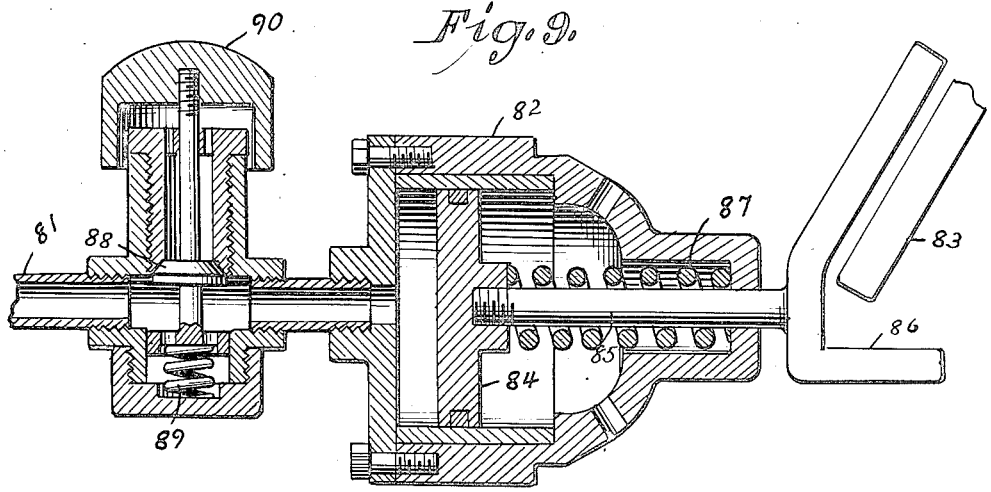
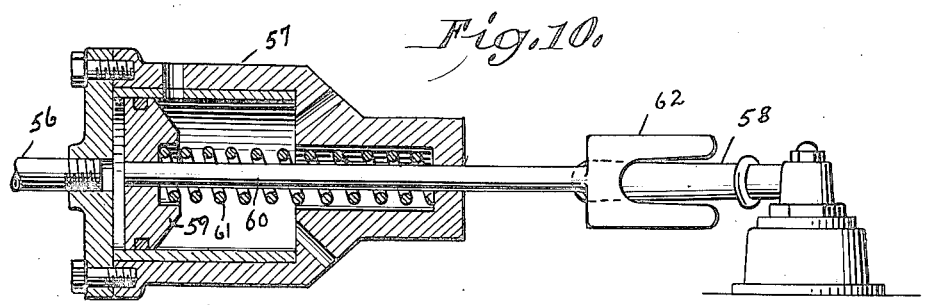
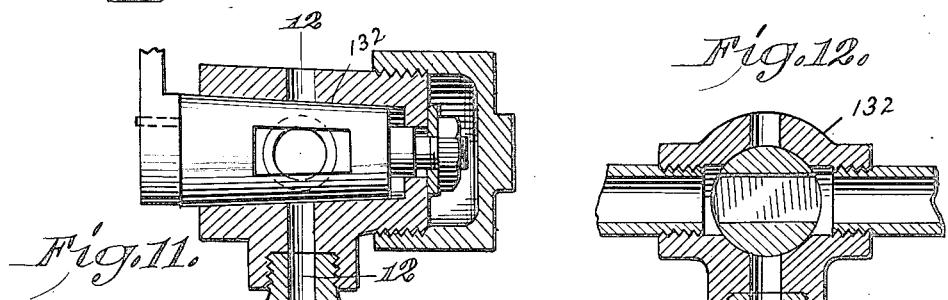
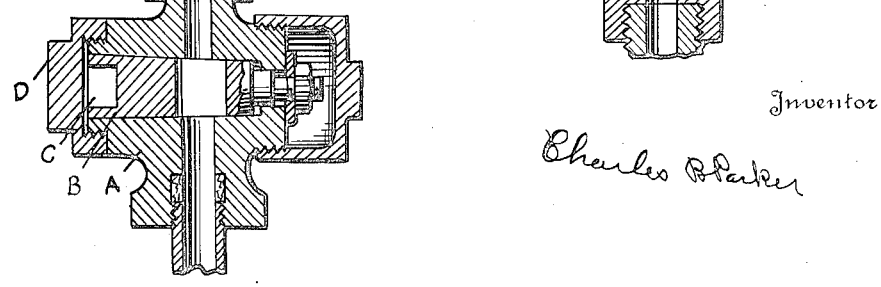

Aug. 14, 1923.
C. B. PARKER
1,464,955
AUTOMATIC TRAIN CONTROL
Filed Dec. 7, 1922
7 Sheets-Sheet 7
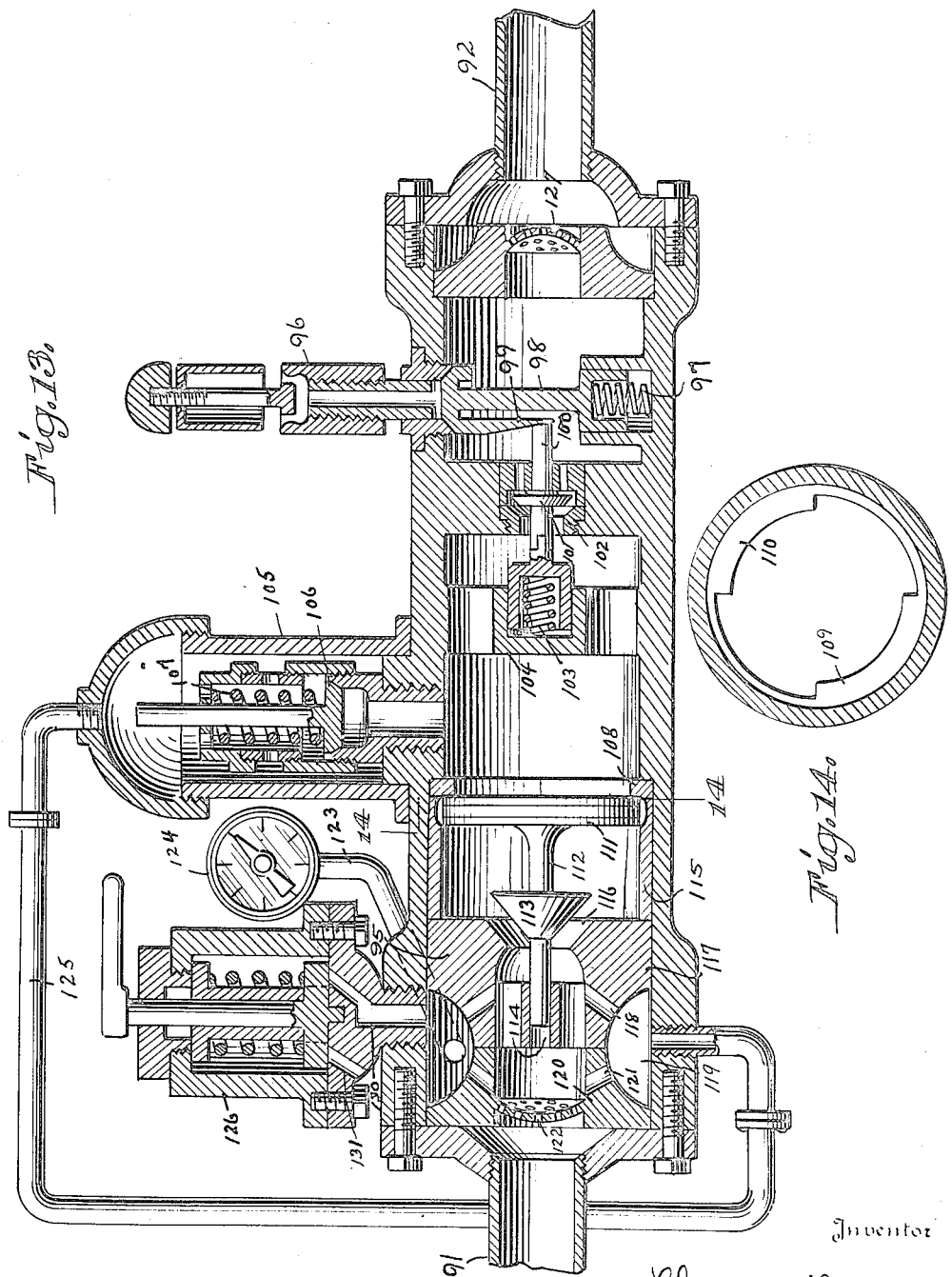
Inventor
Charles B Parker
By
Attorney Patented Aug. 14, 1923.

1,464,955

UNITED STATES PATENT OFFICE.

CHARLES B. PARKER, OF NASHVILLE, TENNESSEE.

AUTOMATIC TRAIN CONTROL.

Application filed December 7, 1922. Serial No. 605,410.

*To all whom it may concern:*

Be it known that I, CHARLES B. PARKER, a citizen of the United States, residing at Nashville, in the county of Davidson and State of Tennessee, have invented certain new and useful Improvements in an Automatic Train Control, of which the following is a specification.

This invention relates to air brake mechanisms for controlling trains and has for its prime object the provision of novel means resulting in a safety device which will give a warning to an engineer and enable him to exert full control over the present air brake systems even though there has been interference in the train line or the engineer's signal line which has resulted in a stoppage or partial stoppage of the circulation of the air, the said invention including means whereby the engineer's signal line and the train line will be coupled or united together by a controlling valve preferably at both the rear of the train and in the locomotive.

Furthermore, it is an object of this invention to provide an engineer's warning valve within the cab so arranged that it will not interfere with the precautionary provisions which are now made for safety in air brake systems in common use, but will be auxiliary to such safety provisions and act independently of them. For instance, if a train line is broken, the mechanism for stopping the train which is now present in train line systems will not be interfered with by this improvement but will give an engineer a signal of the breakage. This invention is intended to operate upon interference of the train lines, which interference often occurs due to the introduction of waste for cleaning the triple valve or the train line or the introduction of sponges or waste which is not removed from the coupling or train pipe, or the turning of angle cocks, or the cutting out of the triple valves which will result in the automatic stopping of the train. A great many causes have been found for impairing the circulation of air through the train line, and it is the object of this invention to warn the engineer if such circulation is interfered with, regardless of the cause of such interference, A further object of my invention relates to means whereby the train will be automatically brought to a standstill whenever the circulation of air in the train line or signal line becomes defective, regardless of whether the engineer takes heed of the warning signal which has been sounded in the locomotive, prior to the application of the brake.

A still further object of my invention is to provide means supported on the rear end of a train whereby the conductor or brakeman may operate the brakes independent of the engineer, and also means supported on the rear end of the train whereby the conductor or brakeman may signal to the engineer that they are about to apply the brakes. This is a very desirable feature of my invention as it allows the train to be under control of the conductor or brakeman when the train is traveling backward or backing into a station or coupling onto other coaches.

These and like objects of the invention will be better understood as the description follows and as is specifically pointed out in the appended claims.

Referring to the accompanying drawings which form a part of this specification,

Figure 2 illustrates a sectional view of the engineer's signal and means for its actuation.

Figure 3 is a vertical section through a compression cylinder for operating the engineer's warning signal.

Figure 4 is a vertical section through a compression cylinder for operating the Westinghouse air brake valve or what is known as the engineer's air brake control valve.

Figure 5 is a longitudinal section through a portion of a compression cylinder for operating the engineer's throttle.

Figure 6 is a section taken on line 6—6 of Figure 5.

Figure 7 is a section taken on line 7—7 of Figure 5.

Figure 8 is a longitudinal section through the engineer's warning signal.

Figure 9 is a longitudinal section, show-

Figure 10 is a vertical section through the engineer's air brake controlling mechanism.

Figure 11 is a vertical section of a three-way valve and its control.

Figure 12 is a section taken on line 12—12 of Figure 11.

Figure 13 illustrates a sectional view of the union coupling which is adapted to be supported on the rear end of the train, and Figure 14 is a section taken on line 14—14 of Figure 13.

Referring to the accompanying drawings in detail, like characters will be used to designate like parts throughout the different views.

Figure 1:
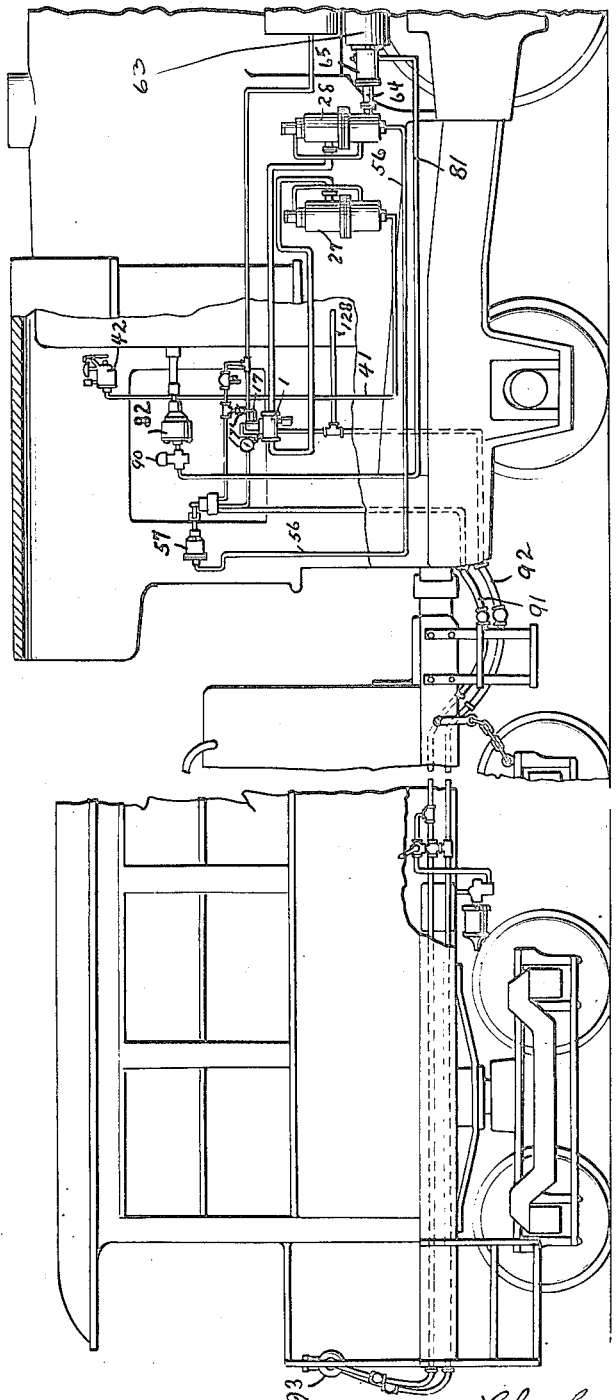
Figure 1 illustrates a view in elevation of an air brake system showing the location of attachments embodying my invention applied thereto.

The engineer's brake testing mechanism which includes the main body or valve 1, in which is positioned a cylinder 2, a piston 3 mounted on the piston rod 4 intermediate the ends of same is slidable in the cylinder 2. End walls 5 and 6 of the cylinder 2 are provided with passageways 7 therethrough, the piston rod 4 being journaled in the end walls 5 and 6. There is a feed groove 8 in the walls of the cylinder 2 and it is intended to permit air to pass the piston 3 when said piston is at the groove. This relation of parts is attained when the pressure of air on both sides of the piston is equal.

A valve casing 9 has a valve seat 10 by which the valve casing is connected to the body 1, the valve seat being screw threaded into a threaded recess in the body. The valve seat 10 has ports 11 and 12 on opposite sides, the purpose of which will be better understood as the description follows. A valve 13 mounted on the lower end of the valve stem 14 is positioned in the valve casing 9 and rests on the valve seat 10.

A handle 15 is mounted on the upper end of the valve stem 14, so that upon turning of the handle and valve stem the valve 13 can be brought into position to permit a notched recess 16 in the underface of the valve to register with port 11, so that air may be brought from the standard equipment of the air brake system through a connecting pipe 17, port 11, recess 16, and into the valve casing 9, then through a central passageway 18 in the valve stem 14 and passageway 19 in the valve seat 10, body 1, and cylinder 2, so that air may enter the pipe 20 leading to the gauge 21, thus indicating to the engineer whether the train line and signal line are in working order, which would normally show seventy pounds of pressure. A valve 17' is located in the connecting pipe 17, so that when the engineer is not using the testing mechanism, the air will be prevented from entering the port 11 and gradually leaking between the valve and valve seat within the casing 9. It is to be understood that before the engineer can use the testing mechanism it is necessary to open the valve 17'.

A blow-off valve 22 is mounted on the underside of the body 1 and communicates with the interior of the cylinder 2 for operation when the air reaches a pressure greater than seventy pounds.

A coil spring 23 normally holds the valve 13 onto its seat, and the piston rod 4 is provided with stops 24 for limiting the movement of the piston in either direction.

The body of the engineer's testing mechanism has pipes 25 and 26 attached to opposite ends of same, said pipes being secured thereto in any suitable way to make an airtight joint. The air passes from the cylinder 2 through the port 7 in the end wall 6, into the pipe 25 from which same discharges into a cylindrical chamber 27, and at the same time air passes around the piston 3 when same is at the groove 8, through the port 7 in the end wall or head 5, into the pipe 26 and discharges into a cylindrical chamber 28, the chambers 27 and 28 being constructed alike in all details, so that a detail description of one of the chambers will be sufficient explanation for both.

The chambers are constructed in two parts and the parts are bolted together as at 29 and a rubber diaphragm 30 is horizontally supported in the chamber by means employed for bolting the parts together. The air from the pipe 25 enters the upper half of the chamber 27 as at 31, passes upwardly through a port 32 of an upper diaphragm guide stem 33 mounted in a stem guide 34, unseats a valve 35 from its valve seat 36 against the tension of a valve spring 37, which permits the air to pass from the valve casing 38 into a pipe 39 which forms a communication between the upper half of the chamber 27 and the lower half of same. The valve 35 remains open until the pressure in the upper or lower half of the chamber 27 is of equal pressure.

If for any reason, such as the train pipe becoming clogged due to waste being lodged in same or turning of any of the angle cocks, or the brake becoming defective in any way, due to the connection between the brake pipe and the signal pipe the pressure in the upper half of the chamber will become less than in the lower half, which will result in the rubber diaphragm 30 being moved upwardly, thus unseating the valve 40 and allowing the air to enter the pipe 41 which leads to an engineer's warning signal 42. The engineer's warning signal 42 comprises a cylinder 43 in which is mounted a piston 44. A whistle 45 is mounted on the body of the cylinder intermediate its ends and a bell 46 is mounted adjacent the end of the cylinder at a point adjacent a pivoted striker arm 47.

When the air enters the cylinder 43 it strikes against the face of the piston 44 and moves same against the tension of a spring 48 until the piston passes a port 49 leading to the whistle 45 and causing a piston stem 50 to bear against the striker arm 47, thus sounding the whistle and bell to warn the engineer that something is defective with the air brake system.

In case the engineer does not take notice of the warning that there is something defective about the air brake system, the air passing around the piston 3 and entering the pipe 26, which discharges into the chamber 28, as at 48, will pass through ports 49 in the rubber diaphragm stem 50, unseat the valve 51 in a casing 52, so that the air will enter in pipe 53 which communicates with a chamber on the lower side of the diaphragm 54. When the pressure in the lower half of chamber 28 becomes greater than the pressure in the upper half, the rubber diaphragm is moved upwardly to unseat a valve 55 and permit the air to enter a pipe 56, which communicates at the opposite end with a cylinder 57, which is positioned in the cab of a locomotive at a point adjacent the standard Westinghouse air brake control lever, which is shown in Figure 10 and indicated by the numeral 58. A piston 59, mounted on one end of a piston rod 60 is positioned in the cylinder 57 and works against the tension of a coil spring 61. The opposite end of the piston rod 60 that extends beyond the cylinder 57 is formed integral with a U-shaped member 62 which engages the lever 58. When the air enters the cylinder 57, the same strikes against the face of the piston and moves same longitudinally against the tension of the coil spring 61, thus permitting the U-shaped member 62 to move the lever 58 to release the air in the train line and automatically bring the train to a stop, regardless of the engineer.

Means for automatically shutting off the steam throttle is indicated by the numeral 63, which is an air container of cylindrical formation and which communicates with the lower half of the chamber 28 by means of a pipe 64 and a piston operating cylinder 65. The piston cylinder is bolted or secured to one end of the cylinder 63 as at 66 to form an air-tight connection. The piston cylinder is provided with a lining 67 which has a groove 68 therein, the purpose of which will be better understood as the description follows. A piston 69 mounted on a piston rod 70 is positioned within the cylinder 65 and is normally at the groove 68, so that the air will be permitted to enter the cylinder 63 from the lower half of the chamber 28. The air after passing through the groove 68 enters the cylinder 63 through ports 71 in a sliding block valve 72, which is mounted for sliding movement on the piston rod 70. The air within the lower half of the cylinder 28 and the cylinder 63 are normally of equal pressure, at which time the parts within the piston cylinder 65 will be in the position indicated in Figure 5.

The piston rod 70 has one end journaled in a guide member 73 positioned centrally of the piston cylinder 63 and a coil spring 74 is located within the guide member between the closed end of same and the face of the piston, and a coil spring 75 is mounted on the piston rod 70 between the piston 69 and the sliding block valve 72 for normally holding said valve in the position indicated in Figure 5. The sliding block valve is provided with an L-shaped passageway 76, which communicates at one end with the cylindrical container 63 and at the opposite end with the passageway through the wall of the cylinder 65 as indicated by the numeral 77, when the pressure within the cylinder 63 becomes greater than the pressure in the chamber 28, due to the air bearing against the inner face of the block and moving same along with the piston 69 in the direction of the chamber 28.

A plate 78 which is curved to conform to the curvature of the sliding block valve 72 is positioned in the cylinder 63 and rests on top of the valve 72. A spring 79 is mounted in a recess in the top of the cylinder 63, one end of the spring bearing against the plate 78, while the opposite end of the spring bears against a screw threaded plug 80, which forms a closure for the recess in which the spring is located. The plate 78 and the spring 79 causes the bottom of the block valve 72 to engage the bottom of the inner wall of the cylinder 63 to prevent air from escaping into the passageway 77 when the valve 72 is in its normal position.

The air passes from the passageway 77 into a pipe 81, the opposite end of which communicates with a cylinder 82 located within the cab of the locomotive and adjacent the engineer's steam throttle lever 83, a portion of which is shown in Figure 9. A piston 84 is located within the cylinder 82 and mounted on one end of a piston rod 85. The opposite end of the piston rod has an approximately L-shaped member formed integral therewith as indicated by the numeral 86, which is adapted to engage the throttle lever 83. A spring 87 is positioned around the piston rod 85, one end of the spring bearing against the piston 84 while the opposite end bears against the closed end of the cylinder 82.

From the foregoing, it can be readily seen that as the air passes from the pipe 81 into the cylinder 82, same bears against the piston 84 and forces same outwardly causing the L-shaped member 86 to move the throttle lever 83, thus shutting off the steam and cooperating with the Westinghouse air brake lever for bringing the train to a standstill.

Positioned within the pipe 81 at a point adjacent the cylinder 82 is a valve 88, which is normally kept closed by means of a spring 89. After the train has been brought to a standstill and it is desired to disengage the L-shaped member 86 from the throttle lever 83, air is released from the cylinder 82 by pressing downwardly on the valve head 90, which allows the air to escape and the coil spring 85 to move the piston 84 and L-shaped member 86 back to the position shown in Figure 9.

From the foregoing description of my invention, it can be readily seen that if the engineer of a locomotive does not take heed of the warning given when testing out the air brake system that some part of same is defective, that the train will be brought to a gradual stop by means of applying air brakes and shutting off the steam.

The numeral 91 indicates a train pipe and the numeral 92 the conductor's signal line, all of which are of standard equipment. In order to provide means for permitting the conductor or other trainmen to signal the engineer from the rear end of the train, which is desirable when the train is moving backward or backing into a station or coupling onto other coaches, the train pipe and signal line are connected at opposite ends on the rear end of the train or rear platform of the rear coach, to what will hereinafter be known as a conductor's union and as indicated by the numeral 93. The opposite end of the train pipe 91 to that which is connected to the conductor's union has communication with the standard Westinghouse air brake valve, while the opposite end of the signal line is connected as at 94 to the body 1 and has communication with the interior of the cylinder 2.

The conductor's union 93 comprises a cylinder 95 which is divided into a plurality of chambers and at the end where the signal line is connected, a whistle 96 is tapped in the wall of the cylinder. The valve for controlling the whistle which is of usual construction, is held seated by a spring 97 bearing against the inner end of the valve stem 98. The valve stem also carries a cam 99 which is adapted to bear against the end of a valve stem 100 in order that the valve 101 of the valve stem 100 will be pressed into engagement with a valve seat 102 when the whistle blows. The valve 101 is held normally in the position shown in Figure 13 by a spring 103 in which position communication is permitted through the conductor's union from one line to the other, it being understood that the spring 103 is seated in a member 104 secured in the cylinder 95 in any appropriate manner. Mounted on top of the conductor's union intermediate the ends of the cylinder 95 is a valve casing 105 which is in communication with the interior of said cylinder 95 and there is a valve 106 therein held normally seated by a spring 107, the spring 107 being of sufficient strength to resist the normal pressure in the lines 91 and 92. A collar 108 is seated in the cylinder on one side of the point of communication of the valve casing 105 with the cylinder 95 and this collar has flanges 109 and 110 which form equipment to limit the movement of a piston or follower plate 111 and the said piston 111 has a valve stem 112 on it which carries a valve 113. A bushing 114 is inserted in the cylinder 95 to form a lining and it has a feed groove 115 formed in it which permits air to pass around the piston from one side to the other in either direction. The valve 113 coacts with the valve seat 116 formed in a plug or partition 117 which bears against one end of the bushing 114. The member 117 has a port extending through it and it has ports 118 diverging from the main port and communicating with an annular chamber 119 which is formed between the periphery of the plug and the wall of the cylinder 95. The plug is made up of sections, one of which is identified by the numeral 120, and it likewise has a central opening with diverging ports 121 communicating with the annular chamber 119.

There is a copper netting or sieve 122 in the element 120 which is intended to arrest dust, scales, or impurities. A pipe 123 leads from the annular chamber 119 to a gauge 124 in order that the trainman may observe whether the pressure in the line is normal or abnormal. A pipe 125 leads from the valve casing 105 and communicates with the annular chamber 119 through the wall of the cylinder 95, and a brake valve of ordinary type as indicated by the numeral 126 is also threaded in the cylinder to communicate with said annular chamber 119.

Should the pressure in the train line fall below normal, the trainman may notice it and operate the whistle to indicate the fact to the engineer, although the fact that the pressure is not normal would be signaled automatically under normal conditions. There is a netting or strainer 127 in the opposite end of the cylinder 95 corresponding to the strainer 122 which has heretofore been described.

When the trainman operates the whistle 96, a reduction of air will take place in the signal line and in the body of the valve or cylinder 2, which will allow the pressure to become greater on the right hand side of the piston 3, thus forcing same past the groove 8 and preventing a reduction of air within the chamber 28 that operates to move the standard Westinghouse air brake throttle and steam throttle. A pipe 128 is connected as at 129 to the signal line at a point adjacent its connection with the body or cylinder 1, so that in case two engines or what is known as a double header are pulling the train, the engineer in the front locomotive will receive the signal through the pipe 128.

When using the brake valve 126 by one of the trainmen, the air in the train line 91 will be reduced and the air in the member 93 remains normal and cuts off communication between the members 113 and 116, which will permit the air in the train line to operate the throttle, whereas without the coacting of these members 113 and 116 the air in the train line would be permitted to escape through the pipe line 91 and prevent the operation of the throttle. The air in the train line is permitted to escape through the ports 130 and 131, in order to perform this function and the amount of air used for this operation may be regulated and registered by the gauge 124, so that the air registered by the gauge will be visible to the eye of the operator. In no way does the use of valve 126 cause the chamber 28 to operate.

Furthermore, if through the neglect of the trainman using the valve 126 he should leave the same positioned to allow all of the air to flow out of the system through ports 130 and 131, and then the air in pipe 92 would decrease the air in 28, a sufficient amount to cause the diaphragm 54 to raise and open check valve 55 and pipe 56 which will place engineer's brake valve 58 in full service, and thereby cause reduction in port 64 allowing air in the accelerator reservoir 63 to force triple valve piston 69 to the left which will open port 76 to force open pipes 77 and 81, thereby shutting off the throttle.

A triple cut-out valve such as 132 is associated with each of the coaches of the train to which the system is applied, and the engineer's signal line is connected to the valve on one side, the train line is connected to the valve on the other side, and a triple valve of the ordinary system is also connected with the valve so that by use of this cut-out valve it is possible to establish communication between the two lines, thus making it necessary to go through the lines to the end of the train.

When the engineer applies the brakes, the engineer's testing mechanism, the conductor's union, and the engineer's signal line should equally have seventy pounds of air. In making a reduction, pressure in the train line becomes less than in the engineer's signal line and the engineer's testing mechanism, the follower plate will move to its seat, closing communication between the controlling valve in the engineer's signal line, an action which will not interfere with the present method of operating brakes.

From the foregoing description of my invention taken in connection with the accompanying drawings, it can be readily seen that I have provided a mechanism for use in connection with the standard air brake equipment on railway trains, that will warn the engineer of any stoppage in the train pipe, which will automatically bring the train to a standstill by shutting off the steam and applying the brakes, and wherein the trainman on the rear end of the train or coach can have full control of the air brakes and whereby said trainman can communicate to the engineer of the train whether or not there is a reduction or stoppage in the train pipe, all of which operates without in any way interfering with the standard air brake equipment.

In the air brake system now in common use, it is impossible for the engineer to have control of his train to effectively stop same when there is interference in the system such as has been mentioned as likely to occur as set forth in the first paragraph of the specification, and it is only through the use of a device having the function of this invention that can make the air brake system now in use, effective to accomplish the results that can be accomplished by the use of this invention.

There is a cut-out valve associated with the three-way valve 122, the operating parts of which are concealed and inaccessible to unauthorized persons, so that it cannot be operated except by special operating means. This cut-out valve includes a casing A having a plug B with a socket C of regular configuration to receive a wrench of special design. The plug is guarded by a cap D which must be removed before a wrench can be used on the plug, and it is the purpose of the inventor to provide this valve in order that it may be closed to separate or interrupt communication between the train line and the signal line should the signal line become damaged to the extent that it could not be corrected by the trainman. This invention would permit the train line to remain inoperative and allow the engineer to control the brakes for a run into a station.

In view of the foregoing description of my invention taken in connection with the accompanying drawings, it is thought that any further explanation as to the construction, operation, and objects of this invention are unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

1. In combination with a signal line and a train line of an air brake system, an engineer's testing mechanism, a conductor's coupling union for the rear end of said lines having means for automatically controlling the air therethrough in either direction, and means associated with the conductor's union for signaling the engineer and applying the emergency brakes.

2. In combination with a signal line and a train line of an air brake system, an engineer's testing mechanism, a conductor's coupling union for the rear end of said lines, means associated with the engineer's testing mechanism for indicating a stoppage in the train pipe, and means connecting the engineer's testing mechanism and the conductor's coupling union for signaling the engineer and applying the emergency brakes from the rear end of the line.

3. In combination with a signal line and a train line of an air brake system, an engineer's testing mechanism, a conductor's coupling union for the rear end of said lines, means for signaling the engineer from the conductor's coupling union, means for automatically applying the emergency brakes from the conductor's union, means associated with the engineer's testing mechanism for indicating to the engineer a stoppage in the train line, and means for automatically applying the emergency brakes without in any way interfering with the standard air brake equipment.

4. In combination with a signal line and a train line of an air brake system, an engineer's testing mechanism, a conductor's coupling union for the rear end of said lines having means for automatically controlling the air therethrough in either direction, means for signaling the engineer and applying the emergency brakes from the conductor's coupling union, means associated with the engineer's testing mechanism for indicating a stoppage in the train pipe line, means for automatically applying the emergency brakes, and means for automatically shutting off the steam throttle of the locomotive.

5. In combination with a signal line and a train line of an air brake system, an engineer's testing mechanism, means for connecting said testing mechanism with the reserve tank of a standard air brake system, means for permitting air of a pressure equal to the train line to pass through said testing mechanism, a pair of air receiving chambers connected to said testing mechanism from opposite ends, means for connecting said chambers with the standard air brake lever and with the steam throttle for automatically applying the brakes and shutting off the steam when a stoppage takes place in the train line.

6. In combination with a signal line and a train line of an air brake system, an engineer's testing mechanism, means for connecting said testing mechanism with the reserve tank of a standard air brake system, means for permitting air of a pressure equal to the train line to pass through said testing mechanism, a pair of air receiving chambers connected to said testing mechanism from opposite ends, means connecting one of said chambers with an alarm placed within the cab of a locomotive for warning the engineer of a stoppage in the train line, and means connected with said chambers and leading to said air brake lever and steam throttle for automatically applying the brakes and stopping the train in case the engineer does not take warning of a stoppage in the train pipe line.

7. In combination with a signal line and a train line of an air brake system, an engineer's testing mechanism, a conductor's union connected to said signal line and train line at the rear end of said lines, means for forming a communication between the signal line and train line interemdiate the engineer's testing mechanism and the conductor's union coupling, means for permitting the engineer to apply the emergency brakes in case a stoppage takes place in the train line, means carried by the conductor's union for indicating a stoppage in the train line, means for signaling the engineer through the conductor's union, and means for automatically applying the brakes through the conductor's union in case of a stoppage in the train pipe line.

In testimony whereof, I have affixed my signature in the presence of two witnesses:

CHARLES B. PARKER.

Witnesses:
  HELEN T. MCKEEVER,
  M. K. JOHNSTON.